US011961529B2

(12) United States Patent
Alexander

(10) Patent No.: US 11,961,529 B2
(45) Date of Patent: Apr. 16, 2024

(54) HYBRID EXPANSIVE FREQUENCY COMPRESSION FOR ENHANCING SPEECH PERCEPTION FOR INDIVIDUALS WITH HIGH-FREQUENCY HEARING LOSS

(71) Applicant: Purdue Research Foundation, West Lafayette, IN (US)

(72) Inventor: Joshua Michael Alexander, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 53 days.

(21) Appl. No.: 17/746,067

(22) Filed: May 17, 2022

(65) Prior Publication Data

US 2022/0366921 A1 Nov. 17, 2022

Related U.S. Application Data

(60) Provisional application No. 63/189,235, filed on May 17, 2021.

(51) Int. Cl.

| | |
|---|---|
| ***G10L 19/02*** | (2013.01) |
| ***G10L 19/20*** | (2013.01) |
| ***G10L 25/18*** | (2013.01) |
| ***G10L 25/21*** | (2013.01) |

(52) U.S. Cl.

CPC .......... *G10L 19/0208* (2013.01); *G10L 19/20* (2013.01); *G10L 25/18* (2013.01); *G10L 25/21* (2013.01)

(58) Field of Classification Search

None

See application file for complete search history.

(56) References Cited

U.S. PATENT DOCUMENTS

| | | | | |
|---|---|---|---|---|
| 9,173,041 | B2 * | 10/2015 | Alexander | G10L 15/08 |
| 10,083,702 | B2 | 9/2018 | Alexander | |
| 2011/0249843 | A1 * | 10/2011 | Holmberg | H04R 25/353<br>381/98 |
| 2013/0262128 | A1 * | 10/2013 | Teutsch | G10L 21/0364<br>704/500 |

(Continued)

OTHER PUBLICATIONS

Alexander, J. M., Individual Variability in Recognition of Frequency-Lowered Speech, Seminars in Hearing, 34, pp. 86-109, 2013.

(Continued)

*Primary Examiner* — Douglas Godbold

(74) *Attorney, Agent, or Firm* — Purdue Research Foundation

(57) ABSTRACT

A method of audio signal processing comprising Hybrid Expansive Frequency Compression (hEFC) via a digital signal processor, wherein the method includes: classifying an audio signal input, wherein the audio signal input includes frication high-frequency speech energy, into two or more speech sound classes followed by selecting a form of input-dependent frequency remapping function; and performing hEFC including, re-coding of one or more input frequencies of the speech sound via the input-dependent frequency remapping function to generate an audio output signal, wherein the output signal is a representation of the audio signal input having a lower sound frequency.

19 Claims, 13 Drawing Sheets

(56) References Cited

U.S. PATENT DOCUMENTS

| | | | | |
|---|---|---|---|---|
| 2013/0322671 | A1* | 12/2013 | Alexander | H04R 25/40<br>381/316 |
| 2015/0317995 | A1* | 11/2015 | De Vries | H04S 7/00<br>704/206 |
| 2016/0249138 | A1* | 8/2016 | Van Der Werf | H04R 25/356 |
| 2018/0166090 | A1* | 6/2018 | Tu | G10L 21/0364 |
| 2020/0396549 | A1* | 12/2020 | Jespersgaard | H04R 25/505 |
| 2021/0067884 | A1* | 3/2021 | Best | H04R 25/45 |

OTHER PUBLICATIONS

Alexander, J. M., Nonlinear frequency compression: Influence of start frequency and input bandwidth on consonant and vowel recognition, The Journal of the Acoustical Society of America, 139, pp. 938-957, 2016.

Alexander, J. M., 20Q: Frequency Lowering Ten Years Later—New Technology Innovations, AudiologyOnline, Article #18040, Retrieved from www.audiologyonline.com, 2016.

Alexander, J. M., The S-SH Confusion Test and the Effects of Frequency Lowering, Journal of Speech, Language, and Hearing Research, 62, pp. 1486-1505, 2019.

Simpson, A. et al., Improvements in speech perception with an experimental nonlinear frequency compression hearing device, International Journal of Audiology, 44, pp. 281-292, 2005.

Simpson, A., Frequency-Lowering Devices for Managing High-Frequency Hearing Loss: A Review, Trends in Amplification, 13(2), pp. 87-106, 2009.

* cited by examiner

HYBRID EXPANSIVE FREQUENCY COMPRESSION FOR ENHANCING SPEECH PERCEPTION FOR INDIVIDUALS WITH HIGH-FREQUENCY HEARING LOSS

CROSS-REFERENCE TO RELATED APPLICATIONS

This application relates to and claims the priority benefit of U.S. Provisional Patent Application Ser. No. 63/189,235, which was filed May 17, 2021, the contents of which are hereby incorporated by reference in its entirety.

TECHNICAL FIELD

The present invention relates to enhancing speech perception for individuals with varying degrees of high-frequency hearing loss by a method of audio signal processing comprising lowering of sound frequency for a digital signal processor, including hearing aid.

BACKGROUND

Usually, the greatest severity of sensorineural hearing loss occurs in the high frequencies. However, hearing aids have a limited ability to provide amplification that is sufficient to overcome the loss of audibility in these frequency regions. One consequence of reduced high-frequency audibility includes a failure to perceive some, or all of the noisy frication energy associated with the speech sound classes known as fricatives, affricates, and stops. Even with the best hearing aids, individuals with high-frequency hearing loss may not hear these speech sound classes, which many normal-hearing listeners also have difficulty hearing in challenging communication situations such as background noise (e.g., “s”, “sh”, “f”, “th”).

Due to limited high-frequency amplification, young children using hearing aids have difficulty perceiving and producing these speech sound classes compared to vowels and other consonant sound classes (Moeller et al., 2010, Ear and Hearing, 31, 625-635). The gravity of this problem is compounded by the regularity with which /s/ and its voiced cognate /z/ occur in the English language (about 8% of all spoken consonants) and the linguistic importance of these sounds. More than 20 linguistic uses for /s/ and /z/ have been identified, including plurality, third-person present tense, past vs. present tense, to show possession, possessive pronouns, contractions, etc. Inconsistent access to these sounds brought about by changes in talkers, background noise, linguistic context, etc. can present a challenge for a child trying to form the rules of their native grammar. These findings have inspired a variety of frequency-lowering techniques (i.e., methods of moving high-frequency speech information into lower-frequency regions) in commercially available hearing aids.

A form of hearing aid processing known as “frequency lowering” is readily available in digital hearing aids to help reduce the communication problems (difficulty understanding conversations and/or having to put in morel listening effort) caused when these sounds are not heard clearly. However, while these solutions can help individuals hear that a speech sound was uttered, they are prone to causing confusion between them (e.g., confusing “sh” for “s” and hearing the word “sign” as “shine”).

All modern methods of frequency lowering in hearing aids limit how signal energy in the low frequencies is affected in order to minimize disturbing changes in pitch, sound quality, and speech intelligibility caused by the signal processing.

There is a need to develop a new frequency lowering method that can distinguish high and low frequencies and reduce speech sound confusions caused by most other frequency lowering methods for individuals with high-frequency hearing loss.

SUMMARY

Provided is a method of audio signal processing for a digital signal processor to improve speech understanding for individuals with varying degrees of high-frequency hearing loss, by lowering the frequencies of speech sounds which reduces speech sounds confusion caused by other digital signal processeors.

The aspect of the invention is, to provide a method of audio signal processing comprising:

(a) receiving an audio signal input via a digital signal processor, wherein the audio signal input includes a speech sound;
(b) detecting high-frequency energy of the speech sound via a detector of the digital signal processor to determine whether frication is present in the audio signal input;
(c) when frication is present in the audio signal input, classifying the audio signal input into two or more speech sound classes;
(d) upon classifying the audio signal input into two or more speech sound classes, initiating a Hybrid Expansive Frequency Compression (hEFC), wherein the hEFC includes, re-coding one or more input frequencies of the speech sound via an input-dependent frequency remapping function to generate one or more output frequencies, wherein the output frequencies are at least one of:
    (A) first compressive and then expansive, or
    (B) first expansive and then compressive; and
(e) generating an output signal from the output frequencies, wherein the output signal is a representation of the audio signal input having a decreased sound frequency.

In an embodiment, provided is the method of audio signal processing further comprising commissioning the digital signal processor, wherein the digital signal processor is a hearing aid, a mobile device, or a computer.

The audio signal input via the digital signal processor can be received directly from an analog-to-digital converter (ADC) or after frequency analysis by any other signal processing method. The detector of the digital signal processor used in step b) is a spectral balance detector.

In an embodiment, provided is the classification of the audio signal input into two or more classes of speech sounds, wherein the classification of the audio signal input includes:

A) comparing a band-pass filtered energy of the audio signal input to a high-pass filtered energy of the audio signal input via the digital signal processor; and
B) selecting a form of the input-dependent frequency remapping function based on the comparison of the band-pass filtered energy and the high-pass filtered energy, wherein the form of the input-dependent frequency remapping function is at least one of:
    (i) compressive in the mid frequencies and expansive in the high frequencies, or
    (ii) expansive in the mid frequencies and compressive in the high frequencies; and C) selecting an expansive compression ratio (ECR) based on the selected form of input-dependent frequency remapping function.

In an embodiment, the band-pass filtered energy of the audio signal input ranges from 2500-4500 Hz, whereas the high-pass filtered energy is greater than 4500 Hz. The classification of the audio signal input into two or more speech sound classes includes a first speech sound class, wherein in the first speech sound class the band-pass filtered energy of the audio signal input segment ranges from 2500-4500 Hz and is greater than the high-pass filtered energy above 4500 Hz and a second speech sound class, wherein in the second speech sound class, the band-pass filtered energy of the audio signal input segment above 4500 Hz is greater than the high-pass filtered energy ranges from 2500-4500 Hz.

The ECR values are selected based on the selected form of input-dependent frequency remapping function. The ECR values can be positive or negative and operable to shift the frequencies of the sound. If the ECR includes a positive value, the speech sounds can shift to the low-frequency end of the output range. If the ECR includes a negative value, the speech sounds can shift to the high-frequency end of the output range.

In some ascpects of the invention, the hEFC includes a re-coding of one or more input frequencies of the speech sound via an input-dependent frequency remapping function, which includes, (i) computing the instantaneous frequency components of the analysis band by comparing the phase shift of the speech sound across successive Fast Fourier Transform segments, and (ii) reproducing the instantaneous frequency components by preserving the instantaneous phase and using sine wave resynthesis to generate one or more output frequencies, wherein the output frequencies is at least one of:

(A) first compressive and then expansive, or (B) first expansive and then compressive.

The method of audio signal processing of present disclosure includes hEFC parameters which can accommodate and optimize speech perception for individual people.

BRIEF DESCRIPTION OF THE DRAWING

The present invention will be more readily understood from the detailed description of embodiments presented below considered in conjunction with the attached drawings of which.

Figure 1:
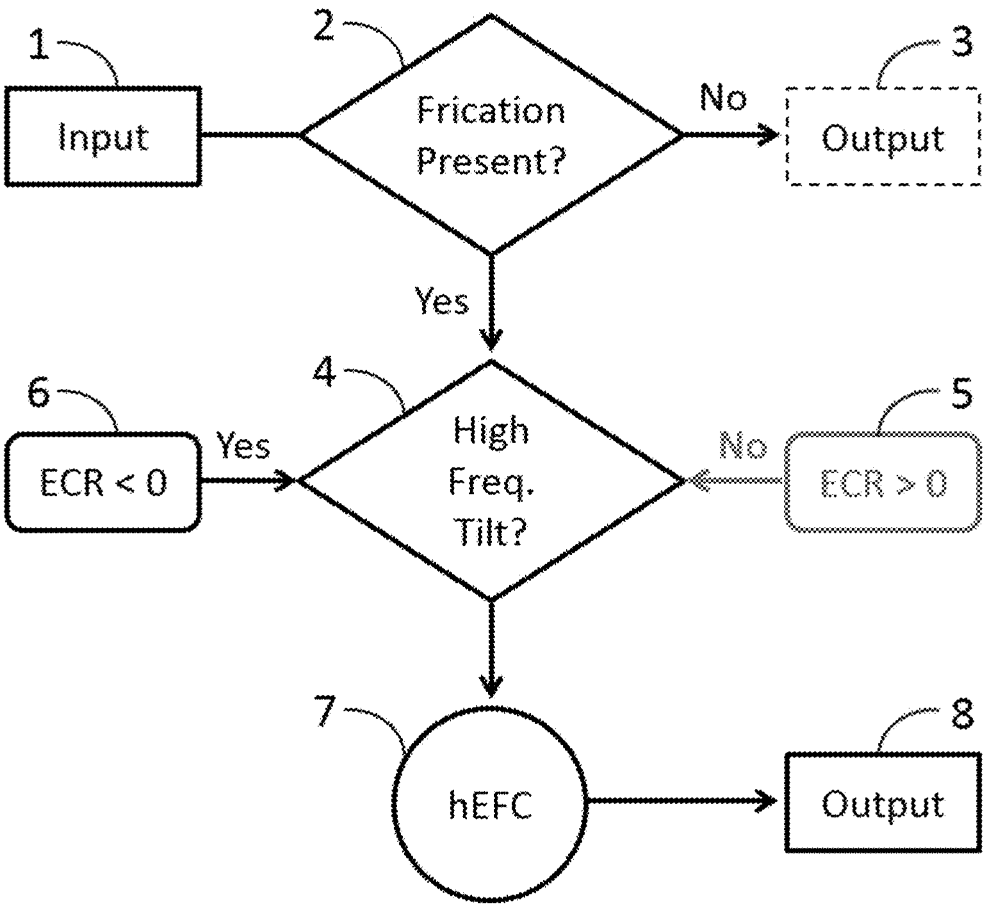
FIG. 1 illustrates a method of audio signal processing of present disclosure for digital signal prcessor, which includes the hEFC (hEFC method).

It is to be understood that the attached drawings are for purposes of illustrating the concepts of the invention and may not be to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Definitions

The term "about" can allow for a degree of variability in a value or range, for example, within 10%, within 5%, or within 1% of a stated value or of a stated limit of a range.

The term "frication" is defined as an acoustic feature of speech sounds produced with an incomplete closure along the vocal tract resulting in aperiodic noise-like energy.

The phrase "analog-to-digital converter (ADC)" is a system that converts an analog signal into a digital signal. It is intended to include any analog signals, including but not limited to, sound signals from a microphone, electromagnetic induction, and wireless transmission from an external device.

Frequency lowering is a feature in hearing aids that moves higher frequency sounds to a lower frequency region in order to provide listeners with information that will allow them to detect critical high-frequency speech cues. All existing methods of frequency lowering compress or linearly transpose high-frequency sounds into low-frequency regions where hearing is more normal.

The present disclosure relates to an audio signal processing method that uses different frequency remapping functions to enhance the perceptual distinctiveness of different speech sounds, thereby increasing speech perception and reducing the cognitive effort necessary to understand the spoken message. The method enhances performance of digital signal processor and therefore improves the speech understanding for individuals with varying degrees of high-frequency hearing loss.

The first aspect of the invention is, to provide a method of audio signal processing comprising:

(a) receiving an audio signal input via a digital signal processor, wherein the audio signal input includes a speech sound;

(b) detecting high-frequency energy of the speech sound via a detector of the digital signal processor to determine whether frication is present in the audio signal input;

(c) when frication is present in the audio signal input, classifying the audio signal input into two or more speech sound classes;

(d) upon classifying the audio signal input into two or more speech sound classes, initiating a Hybrid Expansive Frequency Compression (hEFC), wherein the hEFC includes, re-coding one or more input frequencies of the speech sound via an input-dependent frequency remapping function to generate one or more output frequencies, wherein the output frequencies are at least one of:

(A) first compressive and then expansive, or (B) first expansive and then compressive; and (e) generating an output signal from the output frequency, wherein the output signal is a representation of the audio signal input having a decreased sound frequency.

The method of present disclosure can be implemented with any digital signal processor. In an embodiment, the digital signal processor can be a hearing aid, a mobile device, or a computer. The digital signal processor is the hearing aid.

The method of audio signal processing of present disclosure enhances the performance of digital signal processors; e.g., if a mobile device is integrated with the method of present disclosure it would reduce the speech sound confusion of audio signals received by the mobile device by lowering frequency of speech sound and thereby allowing a hearing-impaired individual to hear improved phone calls.

Figure 2:
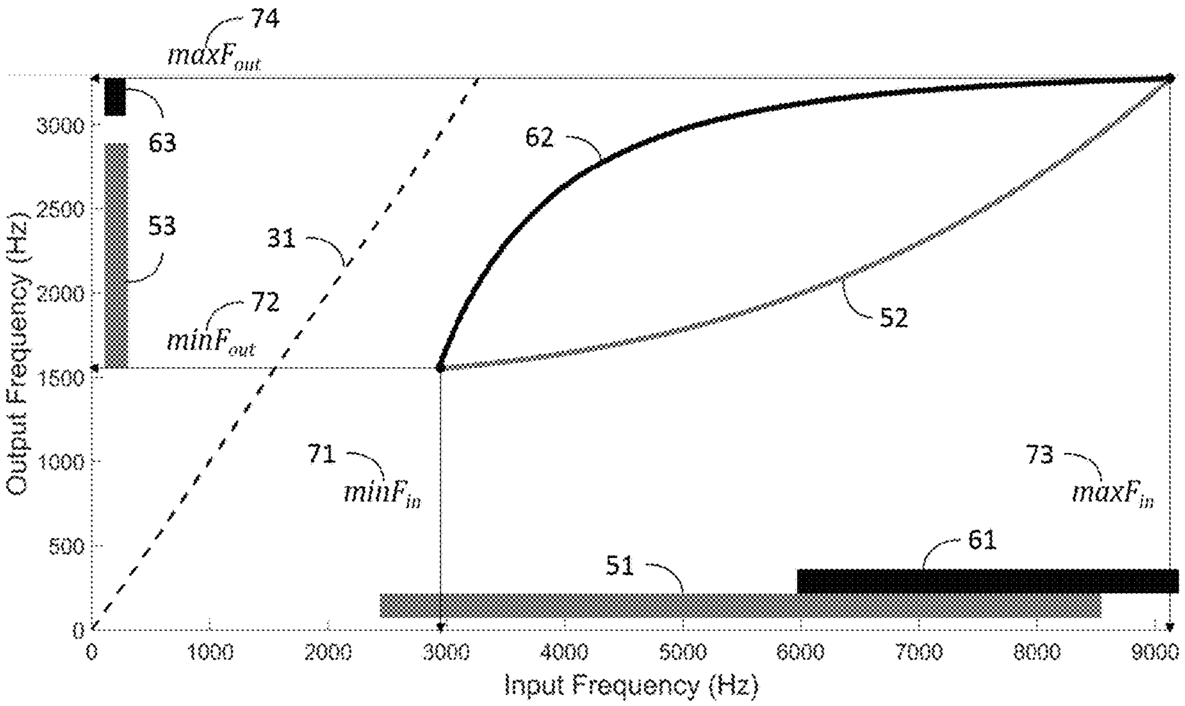
FIG. 2 illustrates a sample frequency input-output function for the hEFC method.

Provided is the method of audio signal processing as described in step (a) to step (e) herein above (hEFC method). The method of the present disclosure can be integrated into digital signal processor to increase the frequency separation between frequency-lowered sounds to enhance the perception of the fricative, affricate, and stop constant speech sound classes. The hEFC method is as depicted in FIG. 1 and FIG. 2, includes an input-dependent frequency remapping function (FIG. 1, 4), that is dependent on the likelihood that the incoming speech originates from one part of the speech spectrum or another part (FIG. 2, 51 and 61). The mapping of input frequencies to output frequencies varies.

The hEFC comprises performing the input-dependent frequency remapping function, which includes a frequency compressive and a frequency expansive region (FIG. 2, 52 and 62) whose order is dependent on the output of the frequency remapping function (FIG. 1, 4). The order of expansion and compression varies depending on the spectral prominences of the incoming sounds to 'push' the prominences toward opposite sides of the output spectrum, thereby increasing the perceptual distinctiveness of speech sounds that might otherwise be confused.

The audio signal input is received via the digital signal processor, wherein the audio signal input includes a speech sound. The audio signal input is directly received from an ADC of the digital signal processor or after signal processing by any other audio signal processing method, e.g., noise reduction or speech-in-noise classification. The digital signal processor can receive the audio signal input to the ADC from sources, including a microphone, electromagnetic induction, and wireless transmission from an external device.

The high-frequency energy of the speech sound from the audio signal input can be classified using the detector of the digital signal processor to determine whether frication is present. Frication is high-frequency aperiodic noise associated with the fricative, affricate, and stop consonant speech sound classes (FIG. 2, 51 and 61).

A detector in step (b) can be a spectral balance detector or a detector consisting of a more complicated analysis of modulation frequency and depth or a combination of parameters. The detector in step (b) is the spectral balance detector.

The spectral balance detector compares the energy above 2500 Hz to the energy below 2500 Hz. The following process works very well for detecting the presence of a high-frequency dominated speech sound when the background is quiet or noisy. Analysis can be carried out over successive windows that are 5.8 ms in duration (i.e., 128 points at a 22,050-Hz sampling frequency). To prevent the detector from being overly active, yet sensitive to rapid changes in high-frequency energy, there is a hysteresis to the detector behavior. In particular, spectral balance can be computed from a weighted history of four successive time segments. The most recent time segment may be assigned the greatest weight (e.g., 0.4) and the most distant time segment may be assigned the least weight (e.g., 0.1). Thus, the detector may be sensitive enough to trigger if an intense but brief, high-frequency sound passes through the ADC. Depending on the input, this could cause the time segment or segments that immediately follow to be lowered. In addition, the detector may be specific enough to not trigger if a brief high-frequency noise sporadically occurred, especially if the ongoing sound is low-frequency dominated, e.g. a vowel. In this case, normal processing would be maintained so as not to disrupt the perception of the ongoing sound.

If the detector senses an absence of viable high-frequency speech energy in the audio signal input, the audio signal input passes to the next processing stage and generates the audio output signal without frequency lowering (FIG. 2, 31). If the detector senses the presence of viable high-frequency speech energy (i.e. frication) then it initiates the classification of the audio signal input into two or more classes of speech sounds.

In some embodiments, the classification of the audio signal input into two or more speech sound classes includes:

A) comparing a band-pass filtered energy of the audio signal input to a high-pass filtered energy of the audio signal input via the digital signal processor; and B) selecting a form of the input-dependent frequency remapping function based on the comparison of the band-pass filtered energy and the high-pass filtered energy, wherein the form of the input-dependent frequency remapping function is at least one of:

(i) compressive in the mid frequencies and expansive in the high frequencies, or (ii) expansive in the mid frequencies and compressive in the high frequencies; and C) selecting an expansive compression ratio (ECR) based on the selected form of input-dependent frequency remapping function.

A decision device of the digital signal processor compares the band-pass filtered energy of the audio signal input segment to the high-pass filtered energy. The band-pass filtered energy of the audio signal input ranges from 2500 Hz to 4500 Hz and the high-pass filtered energy is greater than 4500 Hz. The form of input-dependent frequency remapping function is selected based on this comparison. The selection process determines whether the ECR is positive or negative.

In some embodiments, if the band-pass filtered energy of the audio signal input segment ranges from 2500-4500 Hz is greater than the high-pass filtered energy above 4500 Hz (i.e., a mid-frequency spectral prominence FIG. 2, 51), the input-dependent frequency remapping function is compressive in the mid frequencies and expansive in the high frequencies (FIG. 2, 52). This shifts the speech sounds toward the low-frequency end of the output range (FIG. 2, 53), which is accomplished by using a positive value for the ECR (also, p), as described in FIG. 2. On the other hand, if the band-pass filtered energy of energy of the audio signal input segment above 4500 Hz is greater than the high-pass filtered energy from 2500-4500 Hz (i.e., a high-frequency spectral prominence FIG. 2, 61), the input-dependent frequency remapping function is expansive in the mid frequencies and compressive in the high frequencies (FIG. 2, 62). This shifts the speech sounds toward the high-frequency end of the output range (FIG. 2, 63), which is accomplished by using a negative value for the ECR, (p) described in FIG. 2.

It should be noted that although the above discussion refers to the particular range of audio signal input 2500-4500 Hz, the present invention is not limited to the particular ranges, and different applications may be better suited for other ranges.

This input-dependent frequency remapping function is dependent on the spectral prominence of the incoming audio signal sound, and the mapping varies how input frequencies are reassigned to output frequencies. It enhances the spectral and perceptual dissimilarity of speech sounds produced with an incomplete closure toward the front of the mouth, which creates a peak of frication energy in the high frequencies (e.g., sound [s], FIG. 2, 61) from speech sounds produced with an incomplete closure further back in the mouth, which creates a peak of frication energy in the mid frequencies (e.g., sound [ʃ], FIG. 2, 51). An empirical examination of [s] and [ʃ] recordings in 3 vowel-consonant-vowel contexts ([a], [i], and [u]) from 3 adult male and 3 adult female talkers was used to optimize a decision device based on spectral balance.

In the second aspect of the invention, hEFC is initiated upon classifying the audio signal input into two or more speech sound classes. The hEFC is performed by applying the selected ECR values. The hEFC inlcudes a re-coding of one or more input frequencies of the speech sound via an input-dependent frequency remapping function to generate one or more output frequencies.

In an embodiment, the re-coding of one or more input frequencies of the speech sound via the input-dependent frequency remapping function includes:

(i) computing an instantaneous frequency components of the analysis band by comparing the phase shift of the speech sound across successive Fast Fourier Transform segments, and (ii) reproducing the instantaneous frequency components by preserving the instantaneous phase and using sine wave resynthesis to generate an output frequencies, wherein the output frequency is at least one of:

(A) first compressive and then expansive, or (B) first expansive and then compressive.

The hEFC function as described above is specified by the following formulae:

$$F_{out} = \left(\frac{F_{in}^{p}}{CompRange} \times outputBW\right) - \text{baseline} + \min F_{out} \quad \text{(Eq. 1)}$$

Figure 7:
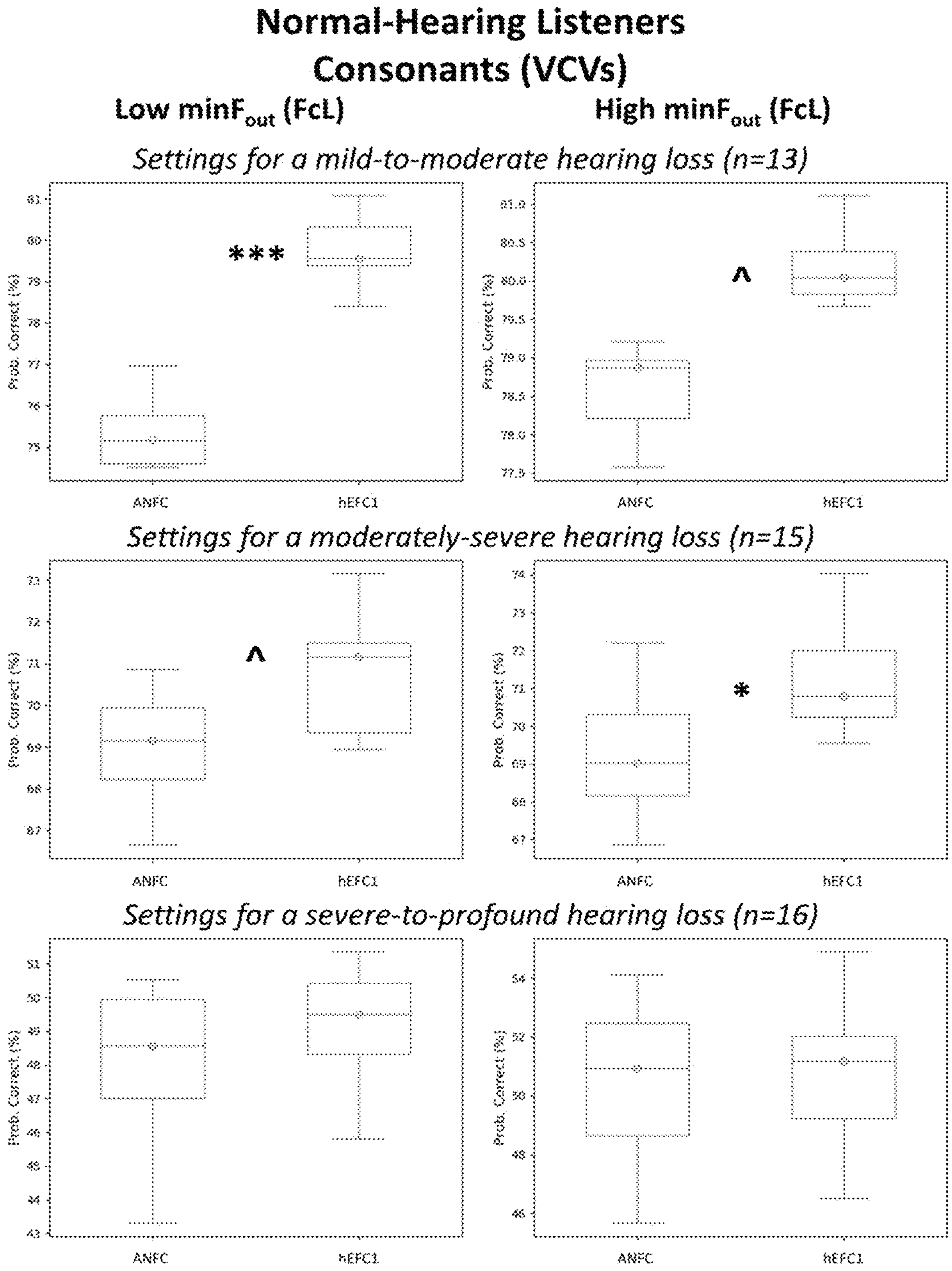
FIG. 7 illustrates the probability of a correct response for the ANFC and hEFC method for consonants among normal-hearing listeners with settings appropriate for three different severities of hearing loss, with the least severe shown in the top row and the most severe shown in the bottom row. The following symbols are used to denote the value of the credible difference, q: ^ (0.6≤q<0.7), * (0.7≤q<0.8),  (0.8≤q<0.9), * (0.9≤q).
Figure 8:
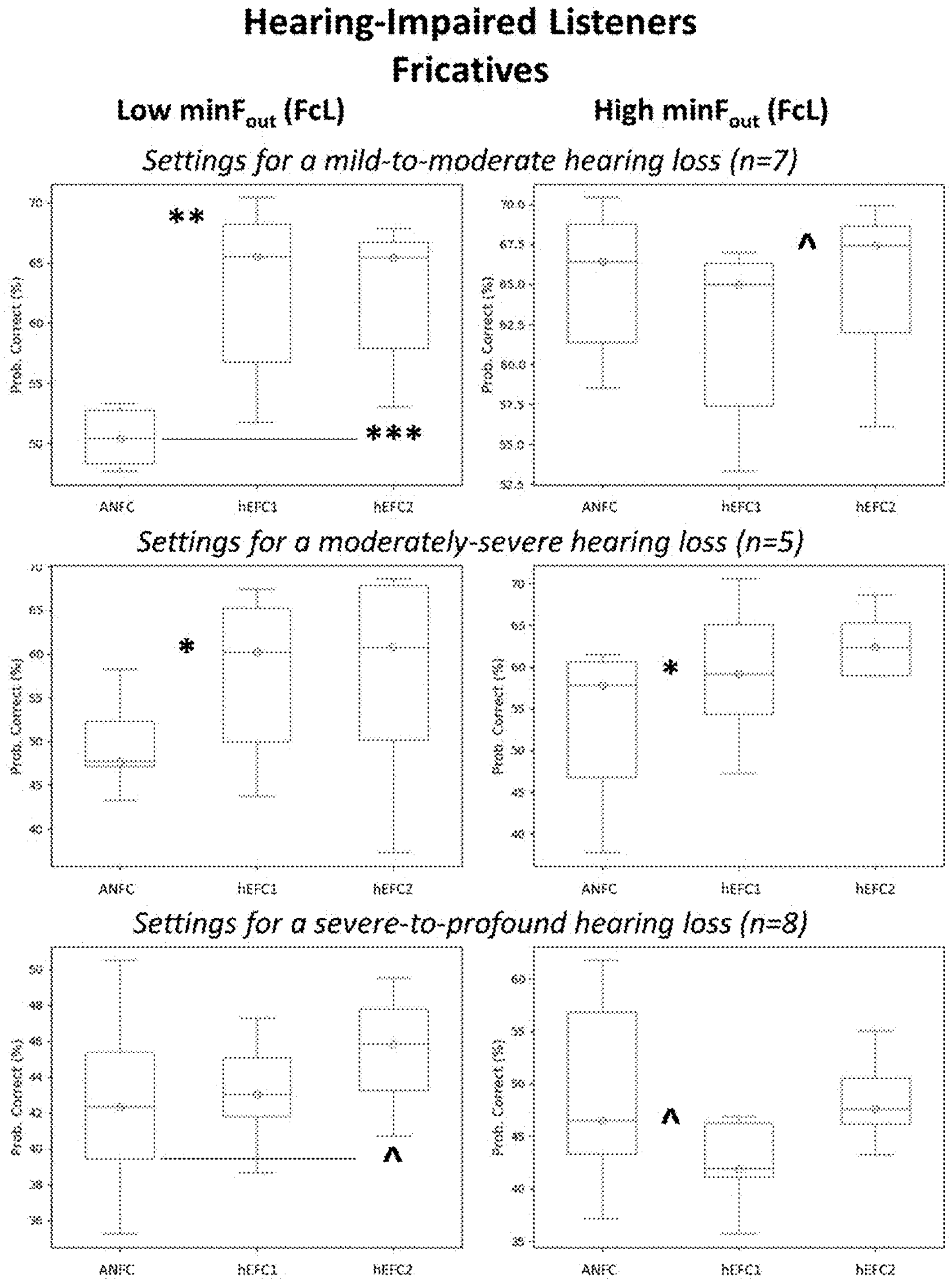
FIG. 8 illustrates the probability of a correct response for the ANFC and two embodiments of the hEFC method which are hEFC1 and hEFC2, wherein hEFC1 includes the frequency lowering of output and hEFC2 does not include frequency lowering for output in FIG. 1, 3, for fricatives among hearing-impaired listeners, with settings appropriate for three different severities of hearing loss, with the least severe shown in the top row and the most severe shown in the bottom row. The following symbols are used to denote the value of the credible difference, q: ^ (0.6≤q<0.7), * (0.7≤q<0.8),  (0.8≤q<0.9), * (0.9≤q).

Wherein, $F_{in}$ are the instantaneous frequencies of the analysis band, $F_{out}$ are the output frequencies, p is the expansive compression exponent, CompRange is the frequency range of the compressed audio signal input, outputBW is the bandwidth (range) of output signal, and baseline normalizes the input-dependent frequency remapping function to the minimum input frequency (min$F_{in}$, FIG. 2, 71) so that the output of the frequency-lowered signal begins at the minimum output frequency (min$F_{out}$, FIG. 2, 72).

$$CompRange = \max F_{in}^{p} - \min F_{in}^{p} \quad \text{(Eq. 2)}$$

$$outputBW = \max F_{out} - \min F_{out} \quad \text{(Eq. 3)}$$

$$\text{baseline} = \left( \frac{\min F_{in}^{p}}{CompRange} \times outputBW \right) \quad \text{(Eq. 4)}$$

wherein, $\max F_{in}$ (FIG. 2, 73) is the maximum input frequency and $\max F_{out}$ (FIG. 7, 74) is the maximum output frequency.

The output signal is generated from the output frequency, wherein the output signal is a representation of the audio signal input having a decreased sound frequency. The frequency-lowered audio signal output can be submitted to the next stage of digital signal processing. It also can be combined with the output with no frication, which can optionally be low-pass filtered (e.g., FIG. 2 at $\min F_{out}$ 72, or $\max F_{out}$ 74).

Figure 3A:
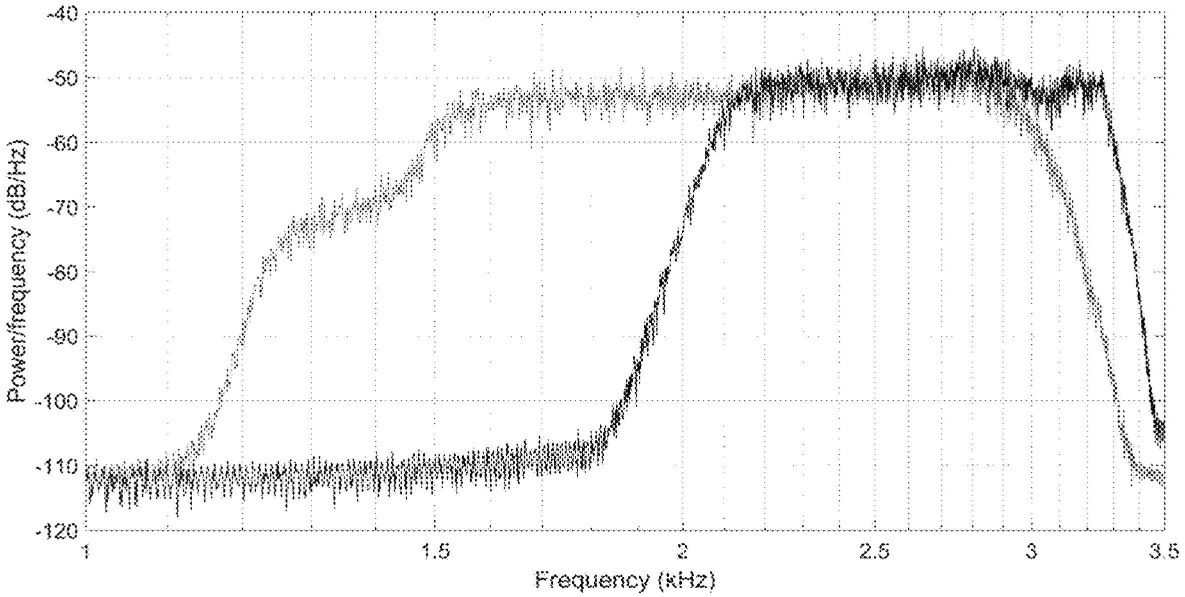
FIG. 3*a* illustrates output spectra of speech sounds [ʃ] (gray in color), commonly spelled “sh”, and [s] (black in color) after using an existing method of frequency lowering of speech sound known as adaptive nonlinear frequency compression (ANFC).
Figure 3B:
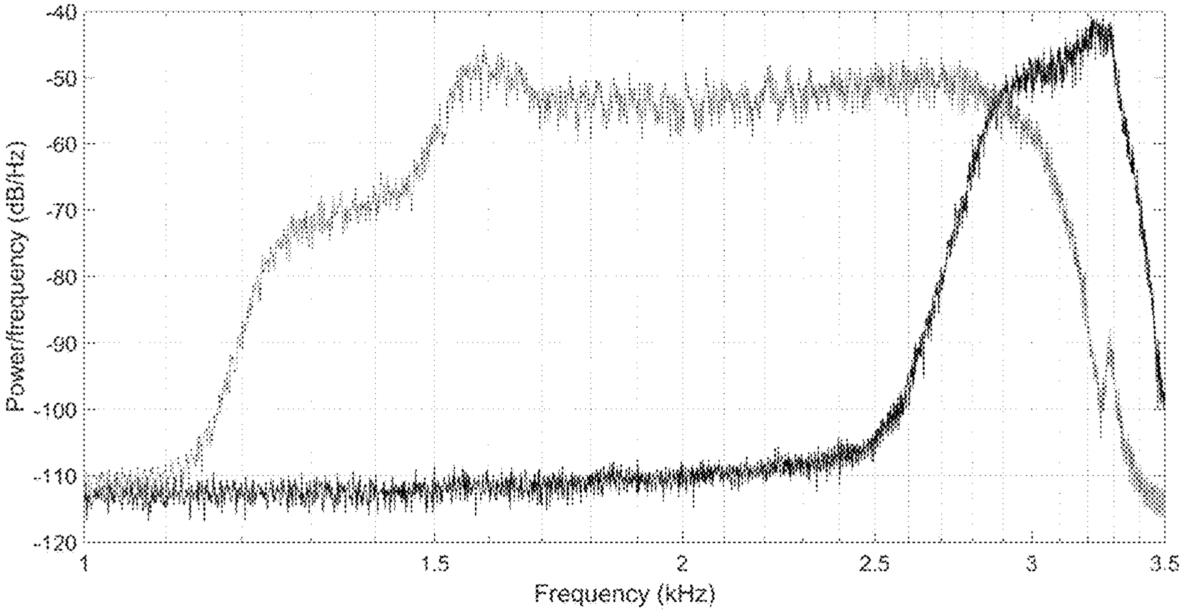
FIG. 3*b* illustrates output spectra of speech sounds [ʃ] (gray in color), commonly spelled “sh”, and [s] (black in color) after frequency lowering of speech sound using the hEFC method.

The output spectra of speech sounds [ʃ] and [s] after frequency lowering using hEFC is compared with output spectra of speech sounds [ʃ] and [s] after processing with a known adaptive nonlinear frequency compression (ANFC) method. FIG. 3*a* shows output spectra of [ʃ] (as shown in gray color) and [s] (as shown in black color) after processing with ANFC, whereas FIG. 3*b* shows output spectra of [ʃ] (as shown in grey color) and [s] (as shown in black color) after processing with hEFC, using the same values for the source and destination range for each. The figures indecate that after frequency lowering using hEFC, the [s] is much further separated in frequency from the [ʃ] compared with frequency lowering using ANFC. Thus, this frequency separation increases the perceptual distinctiveness of words containing these sounds.

The hEFC comprises the five parameters. The parameters are defined by euqations (Eq. 1) to (Eq. 4), as defined above. These parameters are $\min F_{in}$ (FIG. 2, 71), $\max F_{in}$ (FIG. 2, 73), $\min F_{out}$ (FIG. 2, 72), $\max F_{out}$ (FIG. 2, 74), and ECR or p (FIG. 2, 52, 62). The parameters can be adjustable to accommodate differences between individuals and/or to optimize speech perception.

The bandwidth of the output frequency generated by hEFC is set equal to the bandwidth of the audible spectrum by setting the upper-frequency limit of the output, $\max F_{out}$ (FIG. 2, 74), on individual-by-individual basis to equal the maximum audible frequency based on the individual's hearing loss. The ECR (p) may also be routinely set on an individual-by-individual basis in order to maximize the discriminability of [s] and [ʃ]. The assumption is that improveing discrimination for this sound contrast will also improve discrimination of other sound contrasts.

Figure 4:
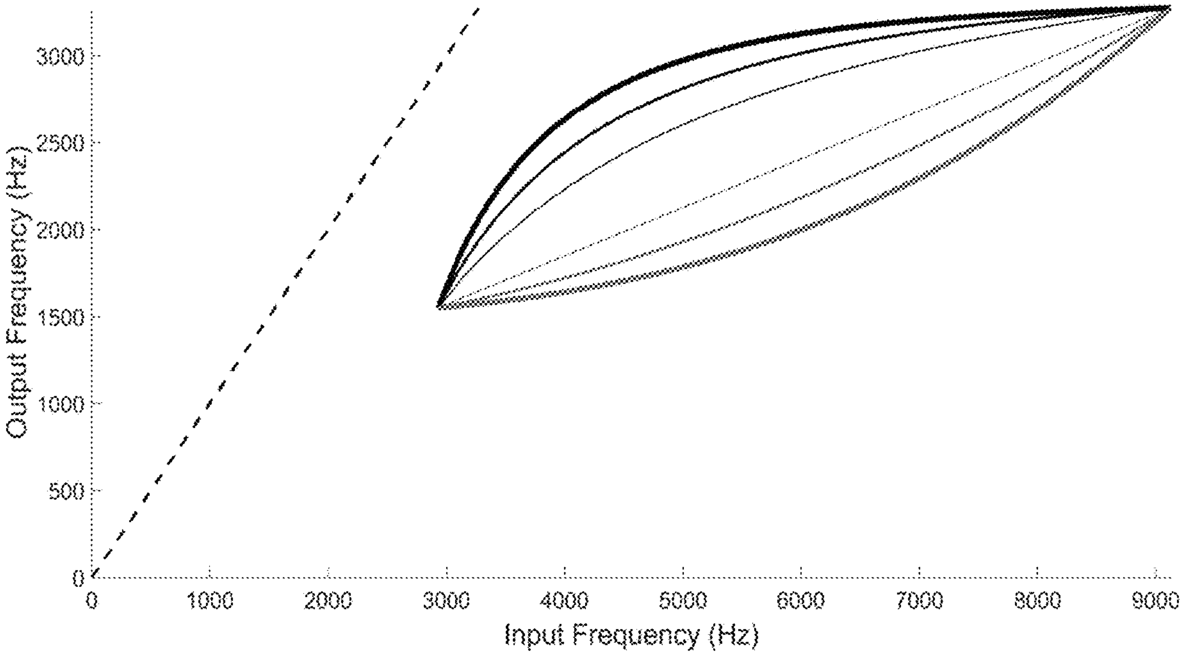
FIG. 4 illustrates frequency input-output functions for varying values of the expansion compression ratio (p) in the hEFC method. Negative values for p are as plotted as black lines and positive values as gray lines, with thick lines corresponding to higher absolute values.

In general, a more negative value of ECR (expansion-compression) should increase the perception of [s], while a more positive value of ECR (compression-expansion) should increase the perception of [ʃ]. FIG. 4 shows the frequency input-output functions for p=−3.0, −2.0, −1.0 (black lines with decreasing thickness) and p=1.0, 2.0, 3.0 (gray lines with increasing thickness) with all of the other parameters being the same as FIG. 2.

The remaining parameters, $\min F_{in}$ (FIG. 2, 71), $\max F_{in}$ (FIG. 2, 73), and $\min F_{out}$ (FIG. 2, 72) can be pre-determined from an optimization criteria for different degrees of hearing loss. In general, lower values for all of these parameters will likely be better for individuals with more severe hearing loss and higher values for those with milder hearing loss.

The features of the embodiments described above may be combined in any possible permutation in other respective embodiments of the present invention.

EXPERIMENTAL

The present disclosure uses some of the best settings for ANFC as a benchmark. ANFC compresses speech information above a given cutoff frequency, Fc. However, the exact nature of this frequency relationship is adaptive because it varies across time in a way that depends on the spectral content of the source at a given instant. Specifically, when the source signal has a dominance of low-frequency energy relative to high-frequency energy (e.g., formants, especially in vowels), frequency compression is carried out with nonlinear frequency compression to preserve low-frequency speech cues. When the source signal has a dominance of high-frequency energy (e.g., frication, especially in fricatives), the frequency-compressed signal undergoes a second transformation in the form of a linear shift or transposition down in frequency.

Figure 5:
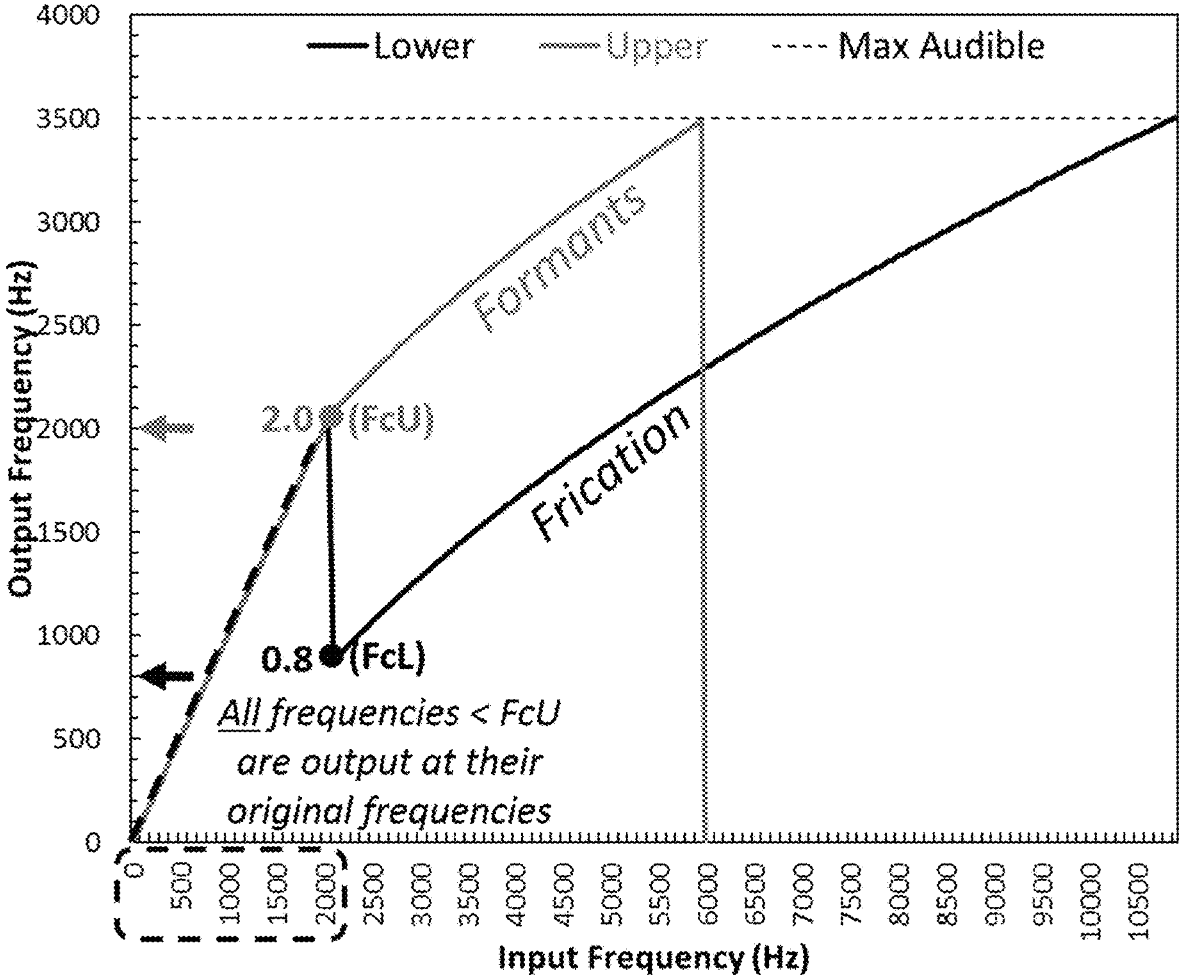
FIG. 5 illustrates the frequency input-output (I-O) function for one ANFC setting. All frequencies below FcU (upper cutoff), 2.0 kHz here, are un-lowered; all frequencies above it are lowered. For all sounds, FcU controls the source region of the input that will be lowered. I-O for low-frequency speech (e.g., formants) follows the gray line, with the lowered output bound between FcU and the max output (thin black dotted line, $maxF_{out}$), 3.5 kHz here. This is the destination region. High-frequency speech (e.g., frication) is first processed with conventional nonlinear frequency compression (NFC) using the same I-O function (gray line) as low-frequency speech, but the output above FcU is then transposed down to FcL (lower cutoff), 0.8 kHz here (black line), with a destination region bound between FcL and $maxF_{out}$.
Figure 6:
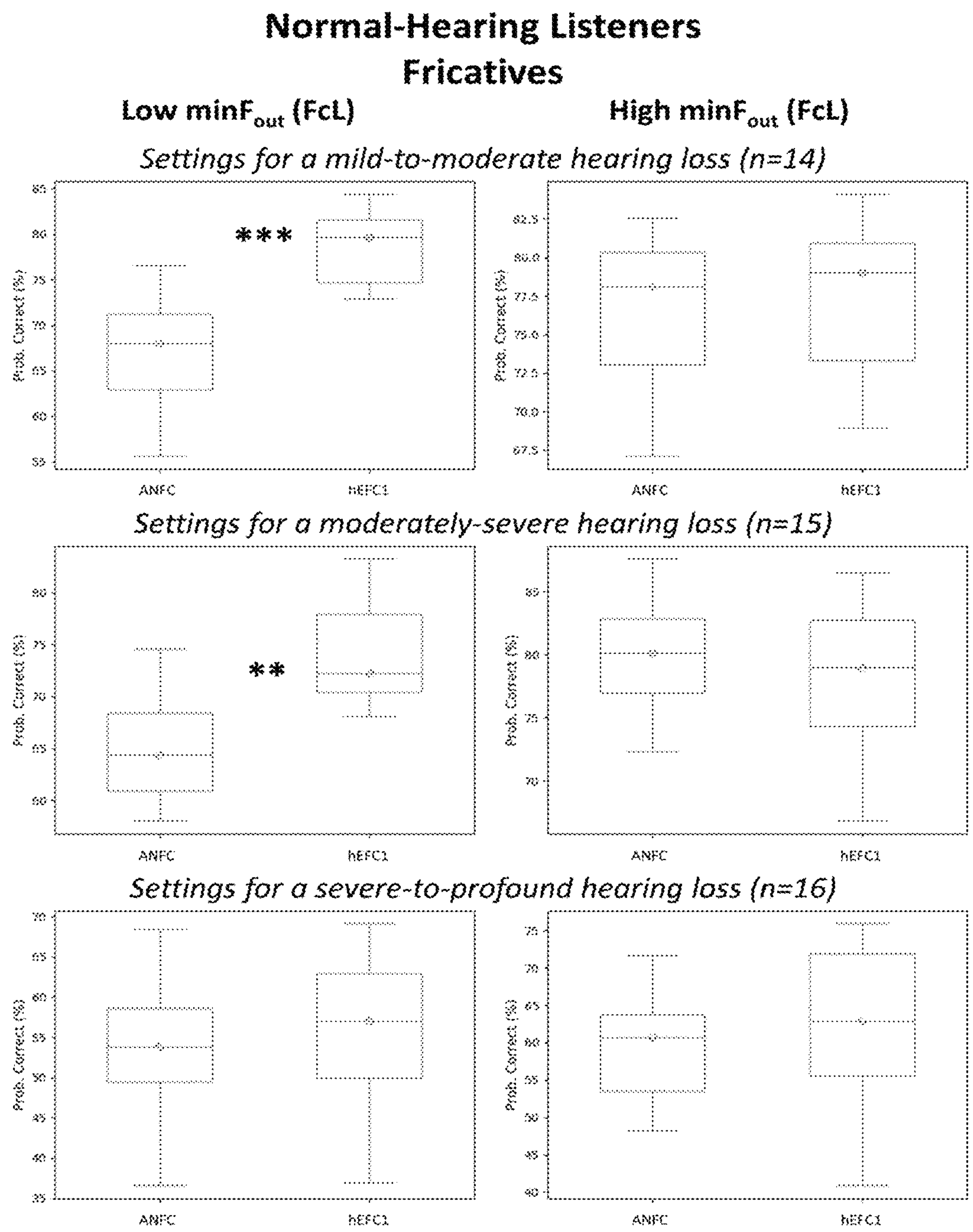
FIG. 6 illustrates the probability of a correct response for the ANFC and hEFC method, wherein hEFC method includes the frequency lowering of output (hEFC1) in FIG. 1, 3, for fricatives among normal-hearing listeners with settings appropriate for three different severities of hearing loss, with the least severe shown in the top row and the most severe shown in the bottom row. The following symbols are used to denote the value of the credible difference, q:  (0.8≤q<0.9), * (0.9≤q), wherein q represents ‘credibility’ value.

The frequencies at which frequency lowering begins are called 'cutoff' frequencies. A higher cutoff frequency called the "upper cutoff" (FcU) is used for low-frequency dominated sounds and a lower cutoff frequency called the "lower cutoff" (FcL) is used after transposition for high-frequency dominated sounds. These parameters and their effects on the input-output frequency relationship are shown in FIG. 5.

The latest commercial method of frequency lowering, adaptive nonlinear frequency compression (ANFC), was used to benchmark the performance of the method of audio signal processing of present disclosure (hEFC method) on normal-hearing listeners.

Listeners were divided into three groups whereby speech was processed with ANFC and hEFC settings appropriate for mild-to-moderate, moderately-severe, or severe-to-profound hearing loss. For comparison, parameters for hEFC1, wherein in hEFC1 the present disclosure method uses frequency lowering for the output in FIG. 1, 3, were set to be equal to the ANFC settings. The only difference was the use of input-dependent frequency remapping functions as determined by (FIG. 1, 4) and the equations for the hEFC (FIG. 1, 7), which had values of p=−3 and 3. For the mild-to-moderate hearing loss settings, $\max F_{out}$=5.0 kHz, $\max F_{in}$=9.1 or 9.7 kHz, $\min F_{out}$ (FcL)=1.9 or 2.9 kHz, and $\min F_{in}$ (FcU)=4.0 kHz. For the moderately severe hearing loss settings, $\max F_{out}$=3.3 kHz, $\max F_{in}$=8.2 or 9.0 kHz, $\min F_{out}$ (FcL)=1.6 or 2.2 kHz, and $\min F_{in}$ (FcU)=2.9 kHz. For the severe-to-profound hearing loss settings, $\max F_{out}$=2.1 kHz, $\max F_{in}$=5.0 or 6.5 kHz, $\min F_{out}$ (FcL)=1.2 or 1.6 kHz, and $\min F_{in}$ (FcU)=2.1 kHz.

Test stimuli consisted of 66 word pairs spoken by a female talker that differed only in the [s] and [ʃ] sound (i.e., the S-SH Confusion Test from Alexander, 2019); 7 fricatives (Fricative Test.) spoken by three female talkers with an initial 'ee' ([i]) as in 'eeS'; 20 consonants spoken by a male and a female talker in three different vowel-consonant-vowel ('VCV Test') contexts: [a], [i], [u] as in 'asa'; and 12 different vowels spoken by 4 men, 4 women, 2 boys, and 2 girls in an h-vowel-d ('hVd Test') context as in 'hud'.

Data were collected from 45 individuals with normal hearing and 20 individuals with hearing loss. Hearing-impaired individuals were tested on frequency-lowering settings that were appropriate for the severity of their hearing loss: mild-to-moderate (n=7), moderately-severe (n=5), and severe-to-profound (n=8). The hearing-impaired participants were tested on the same conditions as the normal-hearing participants in addition to an embodiment labeled 'hEFC2', wherein in hEFC2 the present disclosure method does not uses frequency lowering for the output in FIG. 1, 3.

Figure 9:
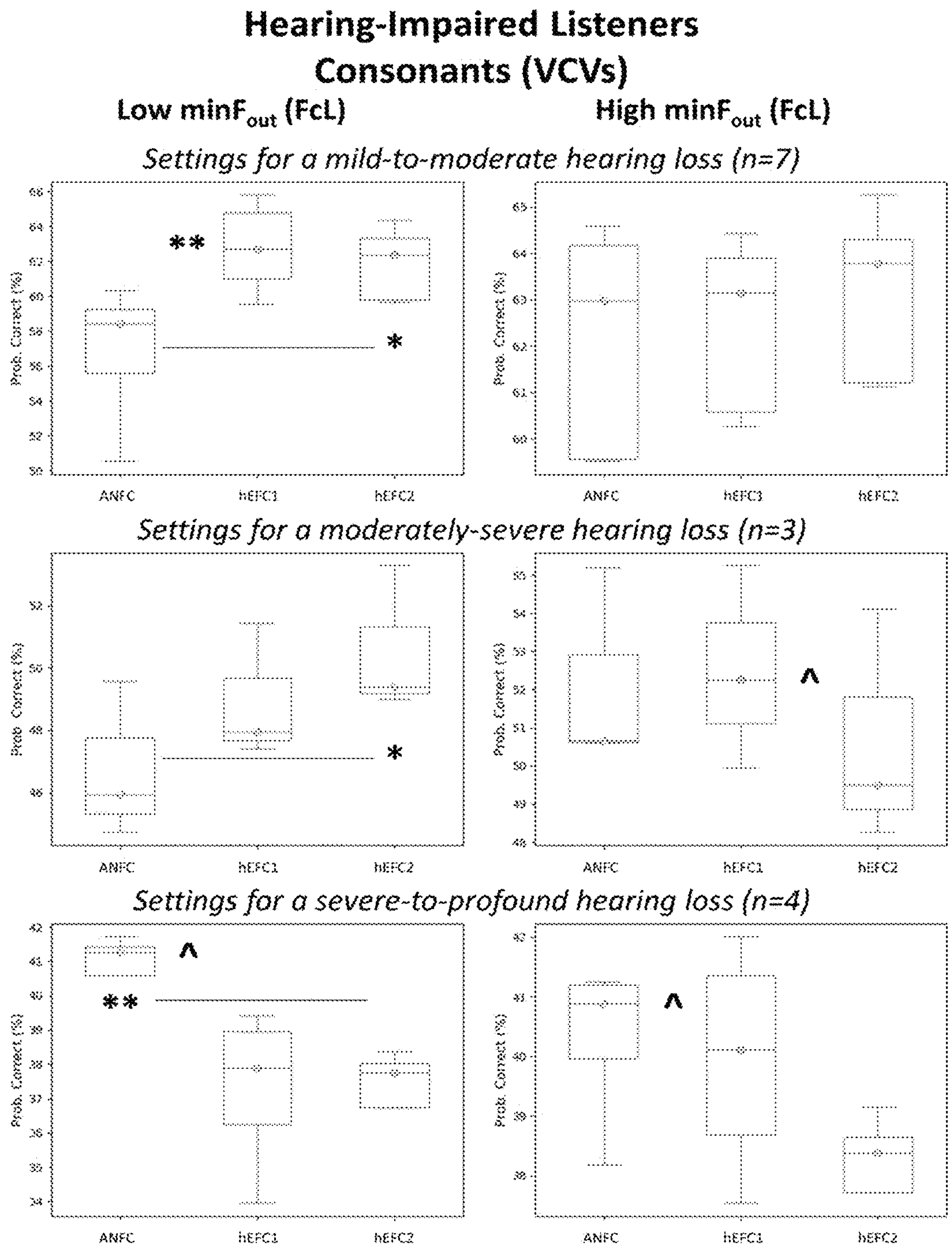
FIG. 9 illustrates the probability of a correct response for the ANFC and two embodiments of the hEFC method (hEFC1 and hEFC2) for consonants among hearing-impaired listeners. The following symbols are used to denote the value of the credible difference, q: ^ (0.6≤q<0.7), * (0.7≤q<0.8),  (0.8≤q<0.9), * (0.9≤q).
Figure 10:
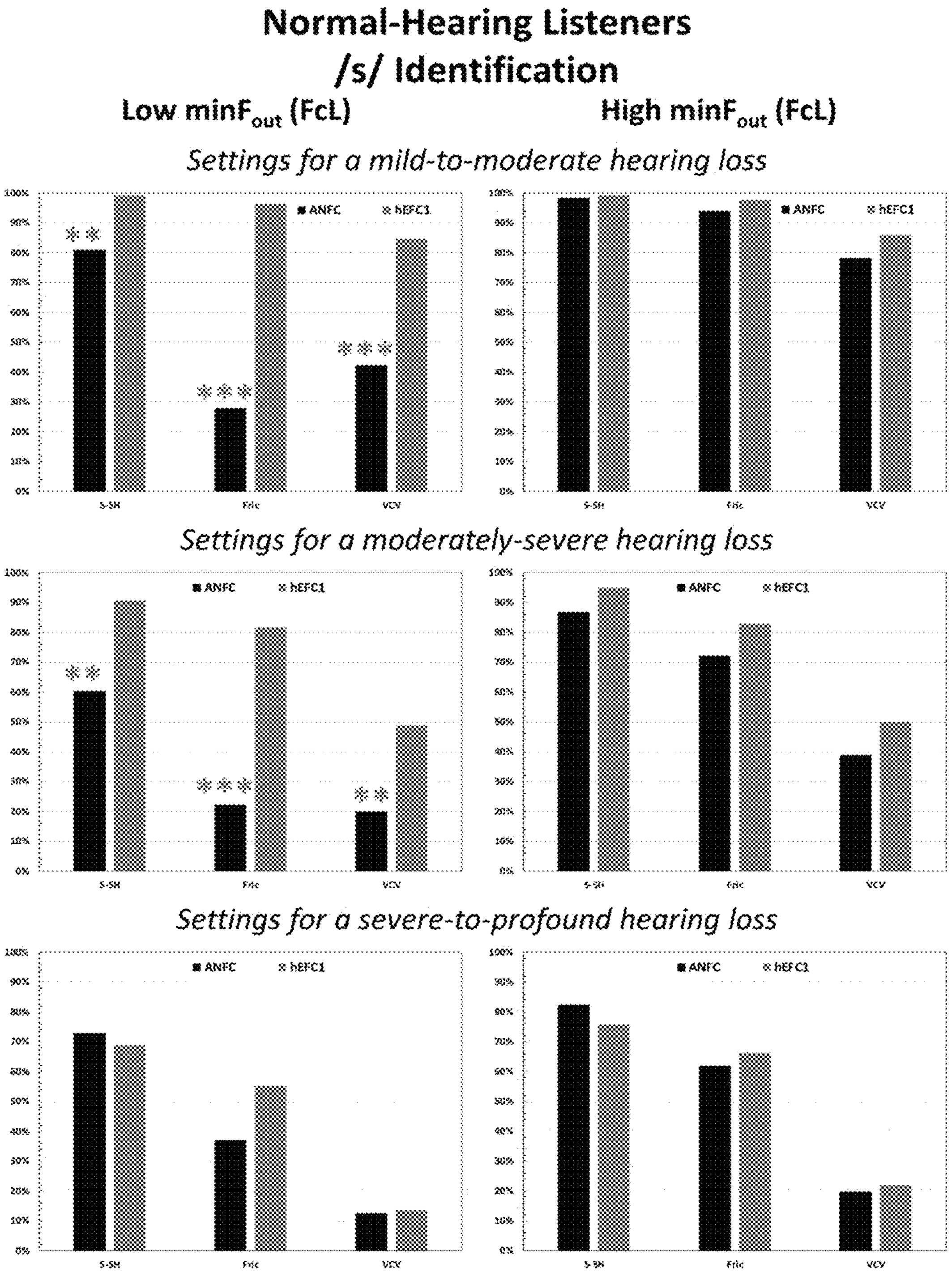
FIG. 10 illustrates the percent correct /s/ identification for the ANFC and hEFC method for normal-hearing listeners. The following symbols are used to denote the value of the credible difference, q:  (0.8≤q<0.9), * (0.9≤q).
Figure 11:
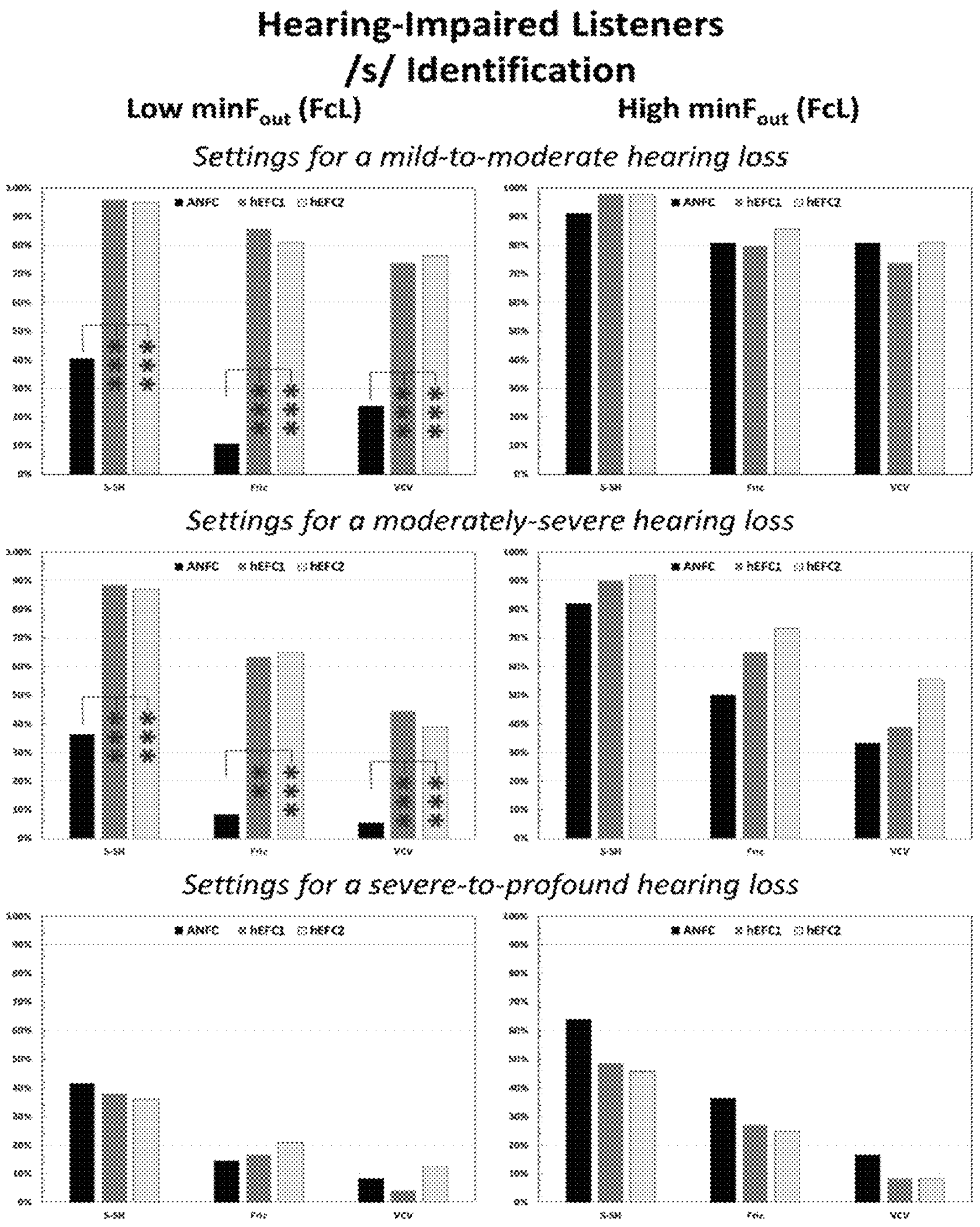
FIG. 11 illustrates the percent correct /s/ identification for the ANFC and two embodiments of the hEFC method (hEFC1 and hEFC2) for hearing-impaired listeners. The following symbols are used to denote the value of the credible difference, q: ^ (0.6≤q<0.7), * (0.7≤q<0.8),  (0.8≤q<0.9), * (0.9≤q).
Figure 12:
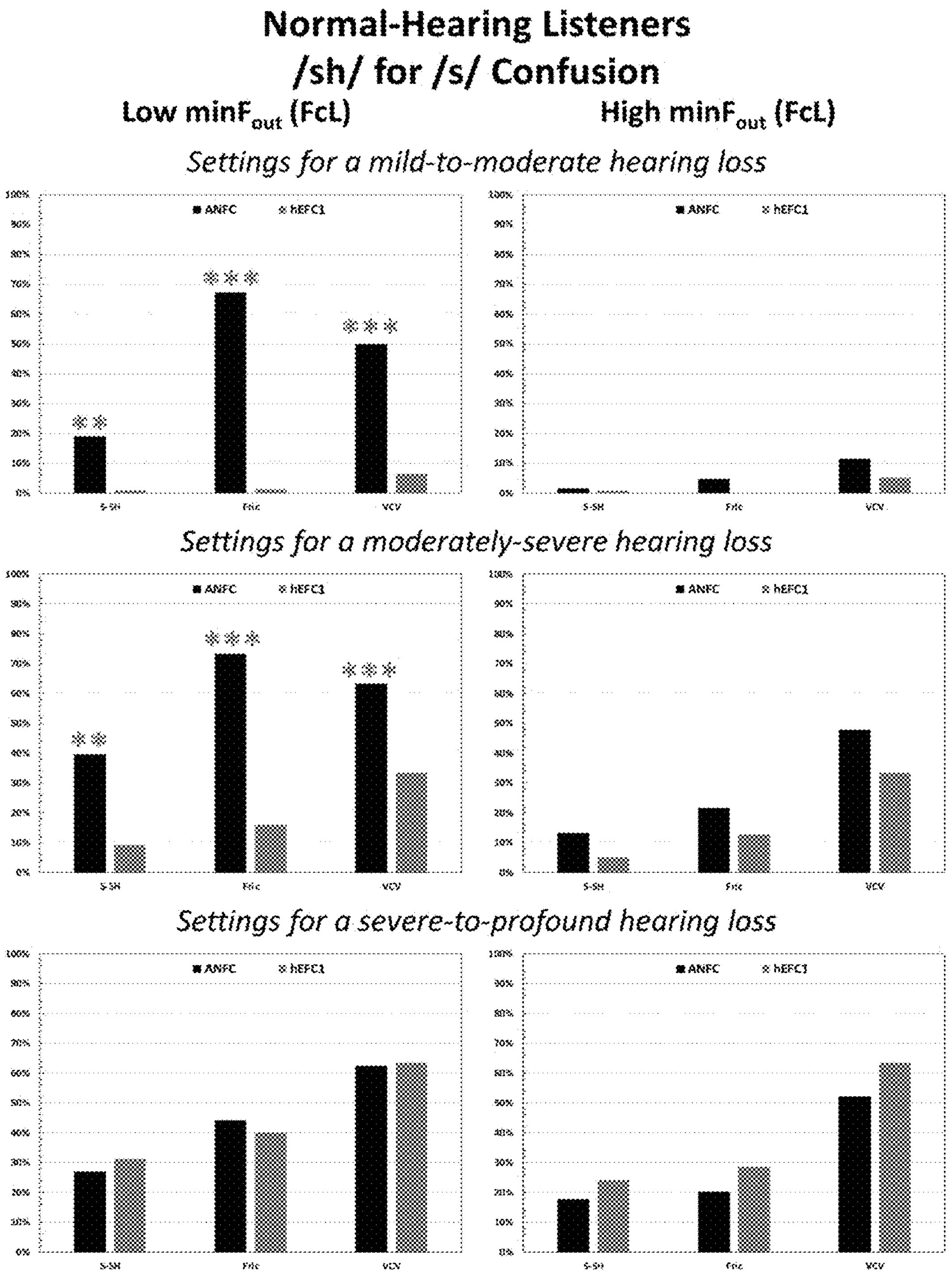
FIG. 12 illustrates the percent confusion of /ʃ/ for /s/ for the ANFC and hEFC method for normal-hearing listeners. Lower percent confusion represents better performance. The following symbols are used to denote the value of the credible difference, q: ^ (0.6≤q<0.7), * (0.7≤q<0.8),  (0.8≤q<0.9), * (0.9≤q).
Figure 13:
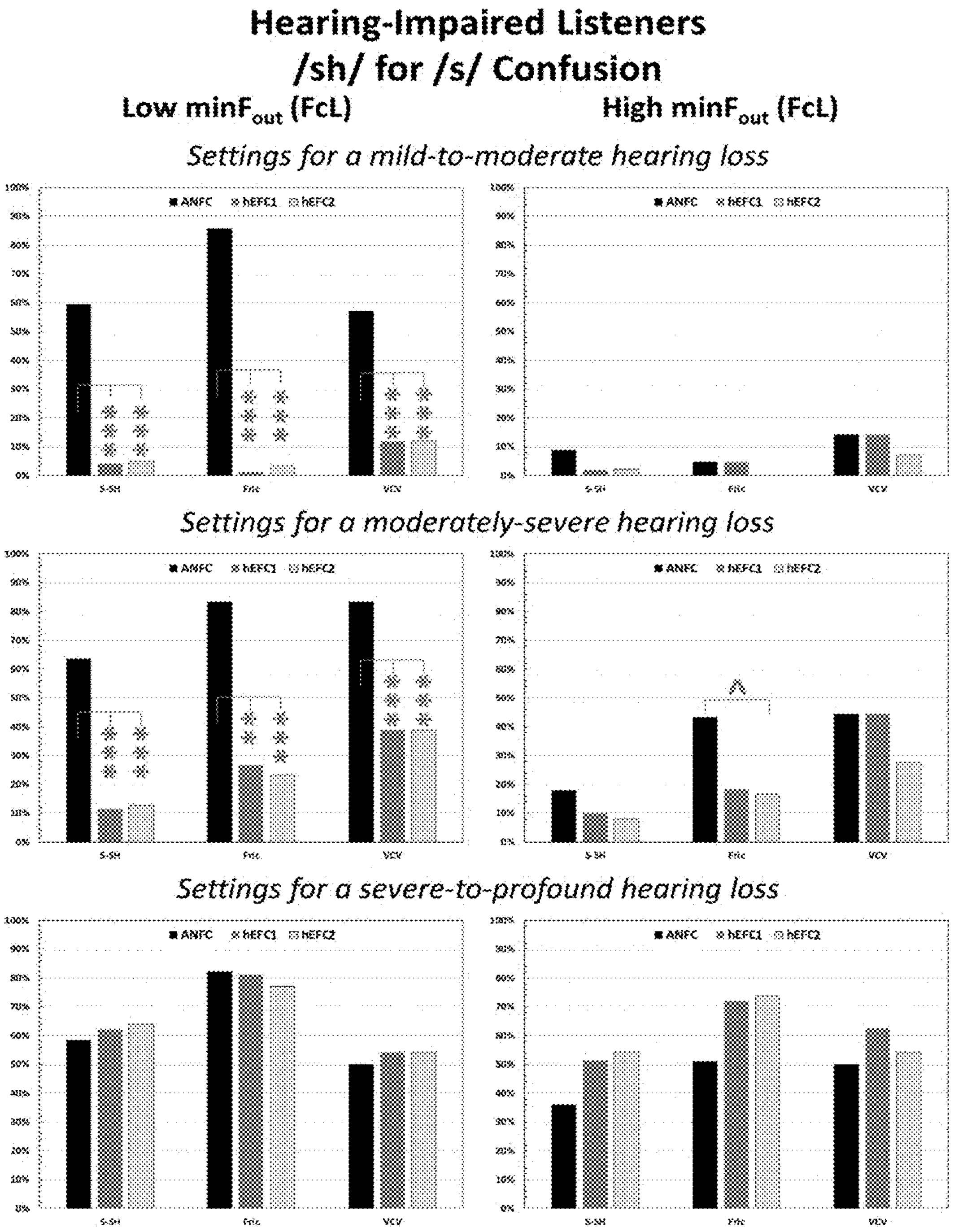
FIG. 13 illustrates the percent confusion of /ʃ/ for /s/ for the ANFC and two embodiments of the hEFC method (hEFC1 and hEFC2) for hearing-impaired listeners. Lower percent confusion represents better performance. The following symbols are used to denote the value of the credible difference, q: ^ (0.6≤q<0.7), * (0.7≤q<0.8),  (0.8≤q<0.9), * (0.9≤q).

Data from both groups of participants were analyzed using sophisticated Bayesian analyses that are designed to find 'credible' differences in how participants identify individual speech sounds across the signal processing conditions (A. Leijon, et.al, (2016), IEEE/ACM Transactions on Audio, Speech, and Language Processing, 24 (3), 469-482). One of the outputs provided by these analyses are 'credibility' values (q). The higher the q-value, the more confidently one can conclude that one manipulation is different from another. Unlike conventional frequentist statistics, which rely on $p<0.05$ of a Type I error as a threshold for determining statistical significance, according to Leijon et al. (2016), it is not possible to determine a fixed threshold for q when doing hypothesis testing. These authors suggest that in the absence of any other information $q>0.5$ might be an acceptable threshold. In the figures supporting this document, the following symbols are used to denote the value of q: ^($0.6\leq q<0.7$), * ($0.7\leq q<0.8$),  ($0.8\leq q<0.9$), * ($0.9\leq q$). Results are shown for the overall probability of a correct response (FIG. 6 to FIG. 9) and for individual stimulus-response combinations, which include correct responses for an individual speech sound (FIGS. 10 and 11) as well as specific confusions (FIGS. 12 and 13). The figures are organized by settings that would be appropriate for different severities of hearing loss (rows) and by the lowest output frequency used for recoding the high-frequency speech (columns)—also, referred to as '$\mathrm{minF}_{out}$' for the hEFC method and 'FcL' for the ANFC benchmark algorithm. These frequencies are labeled 'Low' and 'High' to indicate their values relative to the range of output frequencies for a particular severity of hearing loss. FIG. 9 and FIG. 10 show the differences in the overall probability of a correct response between the ANFC and hEFC methods for Fricative (FIG. 9) and consonant (FIG. 10) identification by the normal-hearing participants. FIG. 11 and FIG. 12 show the results obtained from the hearing-impaired participants in the same conditions with the addition of the hEFC2 condition, These results support the use of the hEFC method over the ANFC benchmark algorithm for the mild-to-moderate and moderately-severe hearing loss settings, especially when relatively low cutoff frequencies were used ('$\mathrm{minF}_{out}$' and 'FcL'). The results for the severe-to-profound hearing loss settings generally indicate that the hEFC method and ANFC are comparable in their performance.

The Bayesian analyses on individual stimulus-response combinations revealed that correct identification of /s/ and confusions of /ʃ/ for /s/ accounted for most of the differences between the hEFC method and the ANFC benchmark algorithm. Correct /s/ identifications in the S-SH Confusion Test (2 response options), the Fricative Test (7 response options), and the VCV Test (20 response options) are displayed in FIGS. 10 and 11 for the normal-hearing and hearing-impaired participants, respectively. Significant improvements—on the order of 60 percentage points, in some cases—were observed across all tests for the mild-to-moderate and moderately-severe hearing loss settings with relatively low cutoff frequencies. Consistent with the overall data shown in FIG. 6-9, no differences between the algorithms were observed for the severe-to-profound hearing loss settings. Confusions of /ʃ/ for /s/ are displayed in FIGS. 12 and 13 for the normal-hearing and hearing-impaired participants, respectively. For these results, a higher percentage corresponds to poorer performance. Since the /ʃ/ response comprised the majority of instances in which the /s/ stimulus was misidentified (obligatory for the S-SH Confusion Test), these results mostly complement the results shown in FIGS. 10 and 11. That is, by enhancing the acoustic differences between the /s/ and /ʃ/ sounds, the hEFC algorithms can re-introduce high-frequency speech information (namely, /s/) to the impaired auditory system without negatively affecting the perception of other speech sounds—a systemic problem among the frequency-lowering algorithms in hearing aids today.

The data shows improvements in discrimination of the "s", "sh", "z" sounds, among others, in a variety of speech contexts by a variety of talkers. In some cases, the improvement over the existing commercial method is a change from about 30% to about 100% performance.

Thus, the present disclosure can help individuals with high-frequency hearing loss to hear the speech sounds that are prone to be confuse and, therefore, enhances their speech perception.

The invention illustratively described herein may be suitably practiced in the absence of any element(s) or limitation(s), which is/are not specifically disclosed herein. Thus, for example, each instance herein of any of the terms "comprising," "consisting essentially of," and "consisting of" may be replaced with either of the other two terms. Likewise, the singular forms "a," "an," and "the" include plural references unless the context clearly dictates otherwise. Thus, for example, references to "the method" includes one or more methods and/or steps of the type, which are described herein and/or which will become apparent to those ordinarily skilled in the art upon reading the disclosure.

It is recognized that various modifications are possible within the scope of the claimed invention. Thus, although the present invention has been specifically disclosed in the context of preferred embodiments and optional features, those skilled in the art may resort to modifications and variations of the concepts disclosed herein. Such modifications and variations are onsidered to be within the scope of the invention as claimed herein.

I claim:

1. A method of audio signal processing comprising:

(a) receiving an audio signal input via a digital signal processor, wherein the audio signal input includes a speech sound;

(b) detecting a high-frequency energy of the speech sound via a detector of the digital signal processor to determine whether frication is present in the audio signal input;

(c) when frication is present in the audio signal input, classifying the audio signal input into two or more speech sound classes, wherein the classification of the audio signal input includes:

A) comparing a band-pass filtered energy of the audio signal input to a high-pass filtered energy of the audio signal input via the digital signal processor;

B) selecting a form of the input-dependent frequency remapping function based on the comparison of the hand-pass filtered enercw and the high-pass filtered energy, wherein the form of the input-dependent frequency remapping function is at least one of:

(i) compressive in the mid frequencies and expansive in the high frequencies, or (ii) expansive in the mid frequencies and compressive in the high frequencies; and C) selecting an expansive compression ratio (ECR) based on the selected form of input-dependent frequency remapping function;

(d) upon classifying the audio signal input into two or more speech sound classes, initiating a Hybrid Expansive Frequency Compression (hEFC), wherein the hEFC includes re-coding one or more input frequencies of the speech sound via an input-dependent frequency remapping function to generate one or more output frequencies, wherein the output frequencies are at least one of:

(A) first compressive and then expansive, or (B) first expansive and then compressive; and (e) generating an output signal from the output frequencies, wherein the output signal is a representation of the audio signal input having a decreased sound frequency.

2. The method of claim 1, further comprising commissioning the digital signal processor, wherein the digital signal processor is a hearing aid, a mobile device, or a computer.

3. The method of claim 1, wherein the detector is a spectral balance detector.

4. The method of claim 1, wherein the classification is based on a spectral prominence of the audio signal input.

5. The method of claim 1, wherein the band-pass filtered energy of the audio signal input ranges from 2500 Hz to 4500 Hz.

6. The method of claim 1, wherein the high-pass filtered energy is greater than 4500 Hz.

7. The method of claim 1, wherein the classifying the audio signal input into two or more speech sound classes includes a first speech sound class, wherein in the first speech sound class the band-pass filtered energy of the audio signal input segment ranges from 2500-4500 Hz and is greater than the high-pass filtered energy above 4500 Hz.

8. The method of claim 1, wherein the classifying the audio signal input into two or more speech sound classes includes a second speech sound class, wherein in the second speech sound class the band-pass filtered energy of the audio signal input segment above 4500 Hz is greater than the high-pass filtered energy ranges from 2500-4500 Hz.

9. The method of claim 1, wherein the ECR includes a positive value operable to shift the speech sound to the low-frequency end of the output range.

10. The method of claim 1, wherein the ECR includes a negative value operable to shift the speech sound to the high-frequency end of the output range.

11. The method of claim 1, wherein the re-coding of one or more input frequencies of the speech sound via the input-dependent frequency remapping function includes:

(i) computing an instantaneous frequency components of an analysis band by comparing phase shift of the speech sound across successive Fast Fourier Transform segments, and (ii) reproducing the instantaneous frequency components by preserving the instantaneous phase and using sine wave resynthesis to generate one or more output frequencies, wherein the output frequencies are at least one of:

(A) first compressive and then expansive, or (B) first expansive and then compressive.

12. A method of audio signal processing comprising:

(a) classifying an audio signal input, which includes a frica ion high-frequency speech energy, into two or more speech sound classes by:

A) comparing a band-pass filtered energy of the audio signal input to a high-pass filtered energy of the audio signal input via a digital signal processor;

B) selecting a form of an input-dependent frequency remapping function based on the comparison of the band-pass filtered energy and the high-pass filtered energy, wherein the form of the input-dependent frequency remapping function is at least one of:

(i) compressive in the mid frequencies and expansive in the high frequencies, or (ii) expansive in the mid frequencies and compressive in the high frequencies; and C) selecting an expansive compression ratio (ECR) based on the selected form of input-dependent frequency remapping function;

(b) upon classifying the audio signal input into two or more speech sound classes, initiating a Hybrid Expansive Frequency Compression (hEFC) comprising a re-coding of one or more input frequencies of the speech sound via the input-dependent frequency remapping function to generate one or more output frequencies, wherein the output frequencies are at least one of:

(A) first compressive and then expansive, or (B) first expansive and then compressive; and (c) generating an output signal from the output frequencies, wherein the output signal is a representation of the audio signal having a decreased sound frequency.

13. The method of claim 12, wherein the re-coding of the input frequencies of the speech sound via the input-dependent frequency remapping function includes:

(i) computing an instantaneous frequency components of an analysis band by comparing phase shift of the speech sound across successive Fast Fourier Transform segments, and (ii) reproducing the instantaneous frequency components by preserving the instantaneous phase and using sine wave resynthesis to generate an output frequency, wherein the output frequency is at least one of:

(A) first compressive and then expansive, or (B) first expansive and then compressive.

14. The method of claim 12, further comprising commissioning the digital signal processor, wherein the digital signal processor is a heating aid, a mobile device, or a computer.

15. The method of claim 12, wherein the classification is based on a spectral prominence of the audio signal input.

16. The method of claim 12, wherein the band-pass filtered energy of the audio signal input ranges from 2500 Hz to 4500 Hz.

17. The method of claim 12, wherein the high-pass filtered energy is greater than 4500 Hz.

18. The method of claim 12, wherein the ECR includes a positive value operable to shift the speech sound to the low-frequency end of the output range.

19. The method of claim 12, wherein the ECR includes a negative value operable to shift the speech sound to the high-frequency end of the output range.

* * * * *